July 27, 1965   S. ROSEN   3,197,285
SAMPLING MACHINE
Filed May 8, 1961   5 Sheets-Sheet 1

INVENTOR
SIDNEY ROSEN

BY *Walter G. Finch*
ATTORNEY

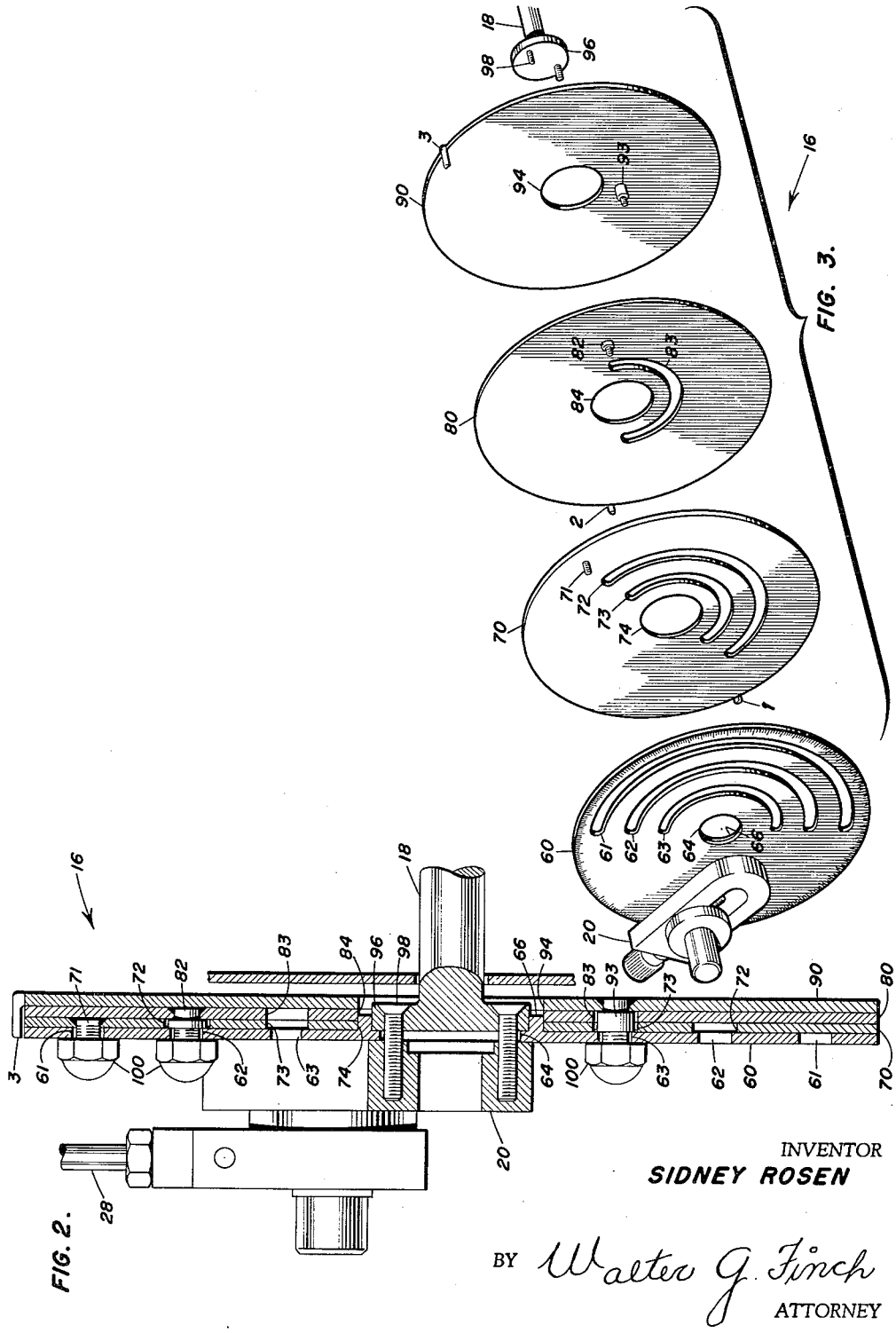

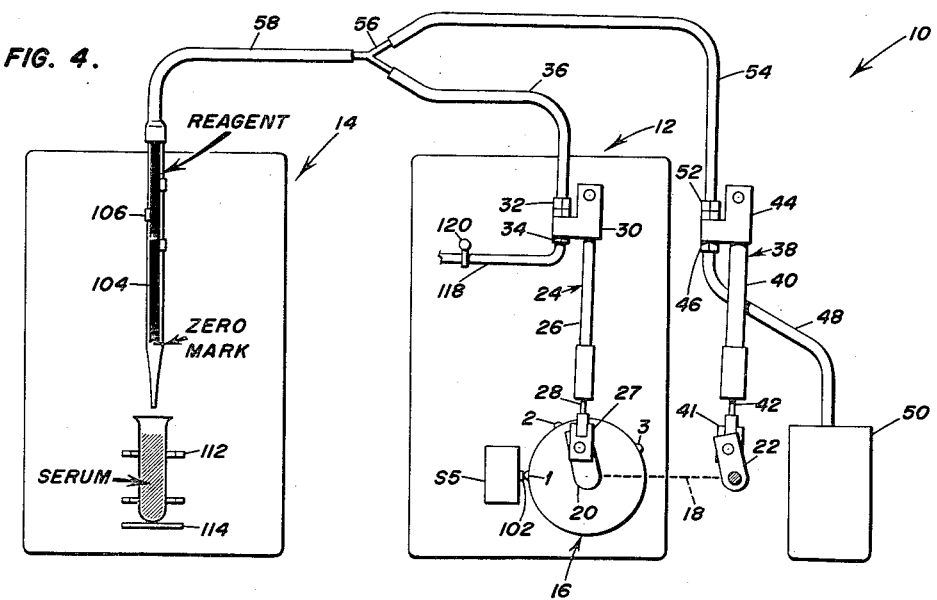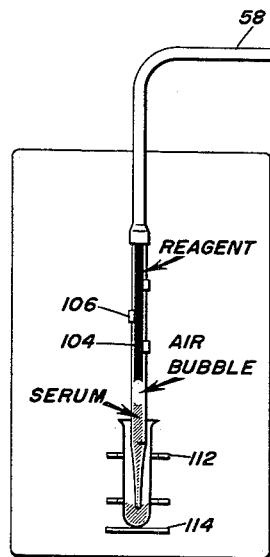

July 27, 1965
S. ROSEN
3,197,285
SAMPLING MACHINE
Filed May 8, 1961
5 Sheets-Sheet 4
FIG. 6.
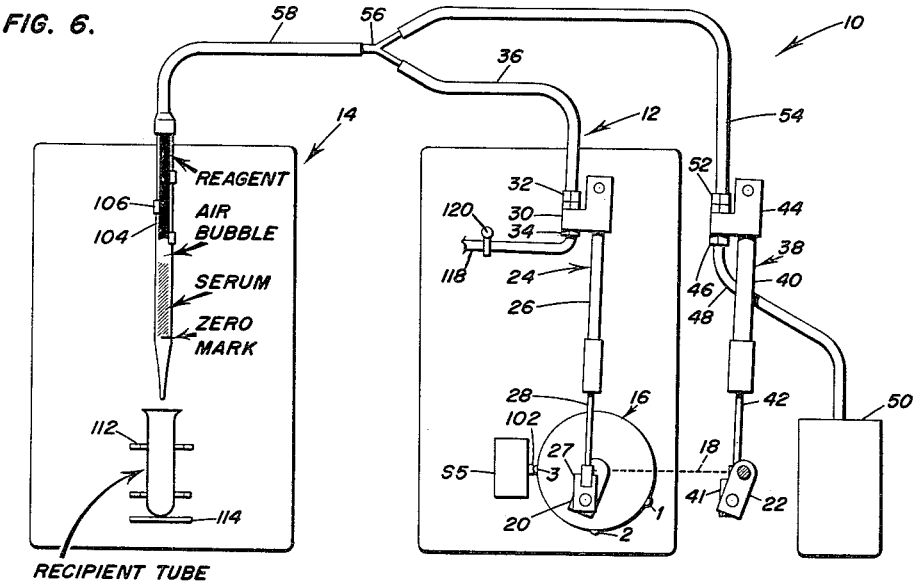
RECIPIENT TUBE
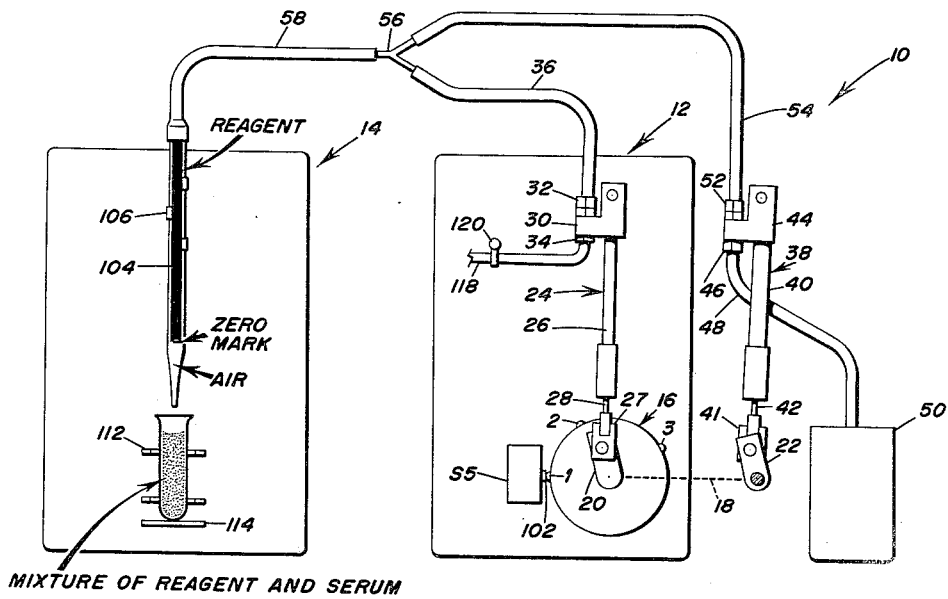
MIXTURE OF REAGENT AND SERUM
FIG. 7.
INVENTOR
*SIDNEY ROSEN*
BY *Walter G. Finch*
ATTORNEY

United States Patent Office 3,197,285
Patented July 27, 1965

3,197,285
SAMPLING MACHINE
Sidney Rosen, 4119 Fordleigh Road, Baltimore, Md.
Filed May 8, 1961, Ser. No. 108,608
7 Claims. (Cl. 23—253)

This invention relates generally to machinery for sampling liquids, and more particularly to an apparatus for rapidly withdrawing from specimen tubes, for purposes of analysis, a succession of precisely measured small quantities of blood serums for delivery, along with an equally precisely measured quantity of a reagent, to a second series of containers.

In the past, laboratory personnel engaged in the analysis of blood serum have had to resort to an extremely tedious and time consuming method of withdrawing small quantities of serum from specimen tubes for transfer to tubes containing a reagent with which the serum is mixed prior to analysis.

A small quantity of serum was first drawn, by means of a syringe bulb, or by sucking with the mouth, into a graduated pipette and then delivered to the recipient tube. Obviously each such operation required a fresh pipette. Consequently, those laboratories handling several hundred specimens daily were required to stock large quantities of pipettes or else cease operations while the pipettes were being washed.

Added to the time loss was the cost of replacement of the quite fragile and rather expensive pipettes which cost in the neighborhood of a dollar apiece when purchased in quantity.

It is an object of this invention, therefore, to provide novel apparatus for rapidly withdrawing from specimen tubes, for purposes of analysis, a succession of precisely measured small quantities of blood serums for delivery, along with an equally precisely measured quantity of a reagent, to a second series of containers.

Still another object of this invention is to provide a machine for analysis of blood serums which is compact, economical to manufacture, and which is efficient and reliable in operational use, and which is easy to maintain.

To provide a machine for sampling liquids, such as blood serums, quickly and reliably without loss of time, is still another object of this invention.

These and other objects and attendant advantages of this invention will become more readily understood from the following detailed description and accompanying drawings in which:

FIG. 2 is a cross section taken generally along line 2—2 of FIG. 1 with certain elements, which normally would not fall in the plane of the section, having been rotated into the plane for further purposes of clarity and illustration;

FIG. 3 is an exploded perspective of a sequencing cam element of the machine;

Figure 8:
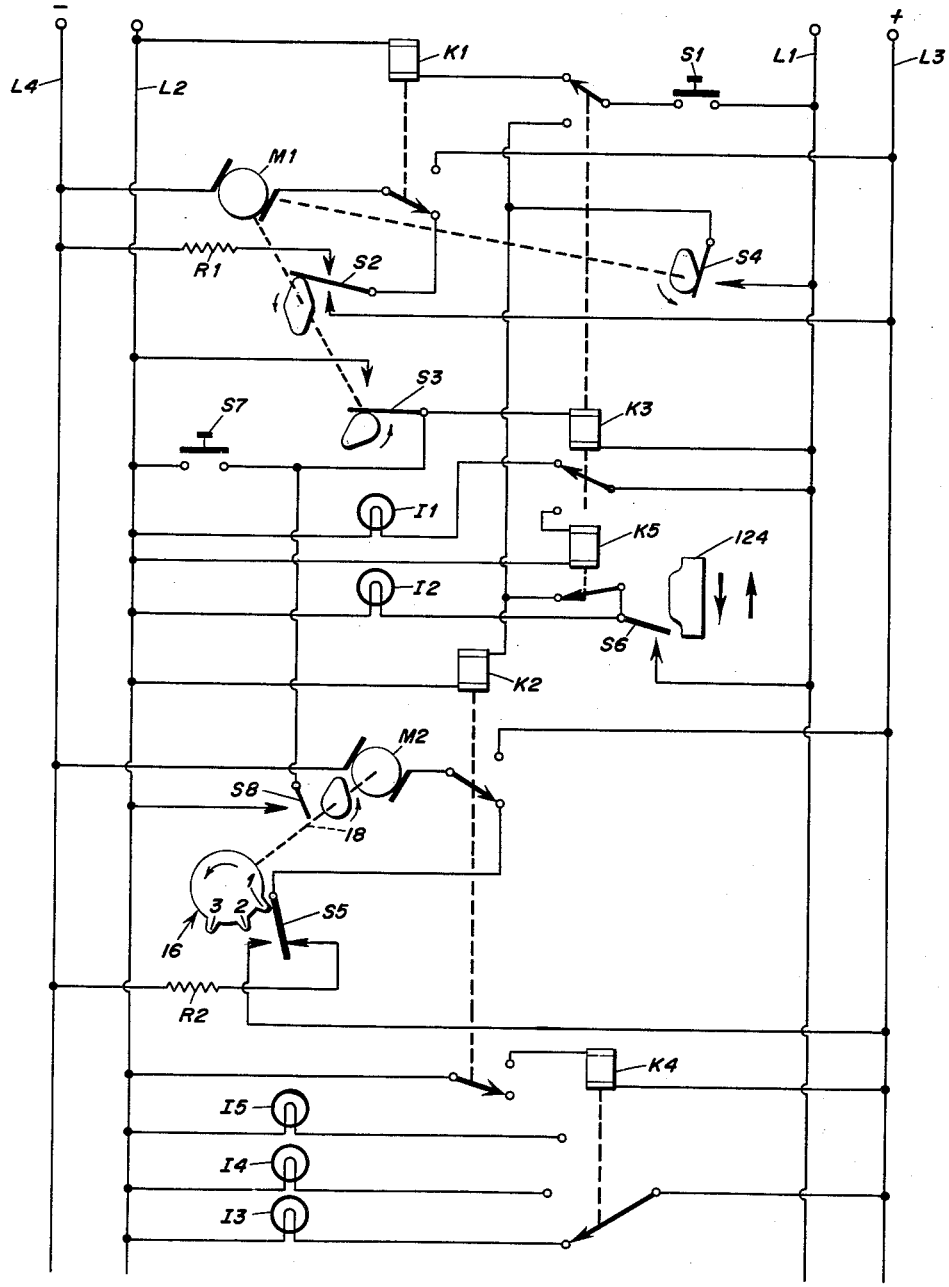

FIGS. 4 through 7 comprise a series of diagrammatic elevations of the machine which depict a full cycle of operation thereof; and FIG. 8 diagrams the electrical circuitry of the machine.

Figure 1:
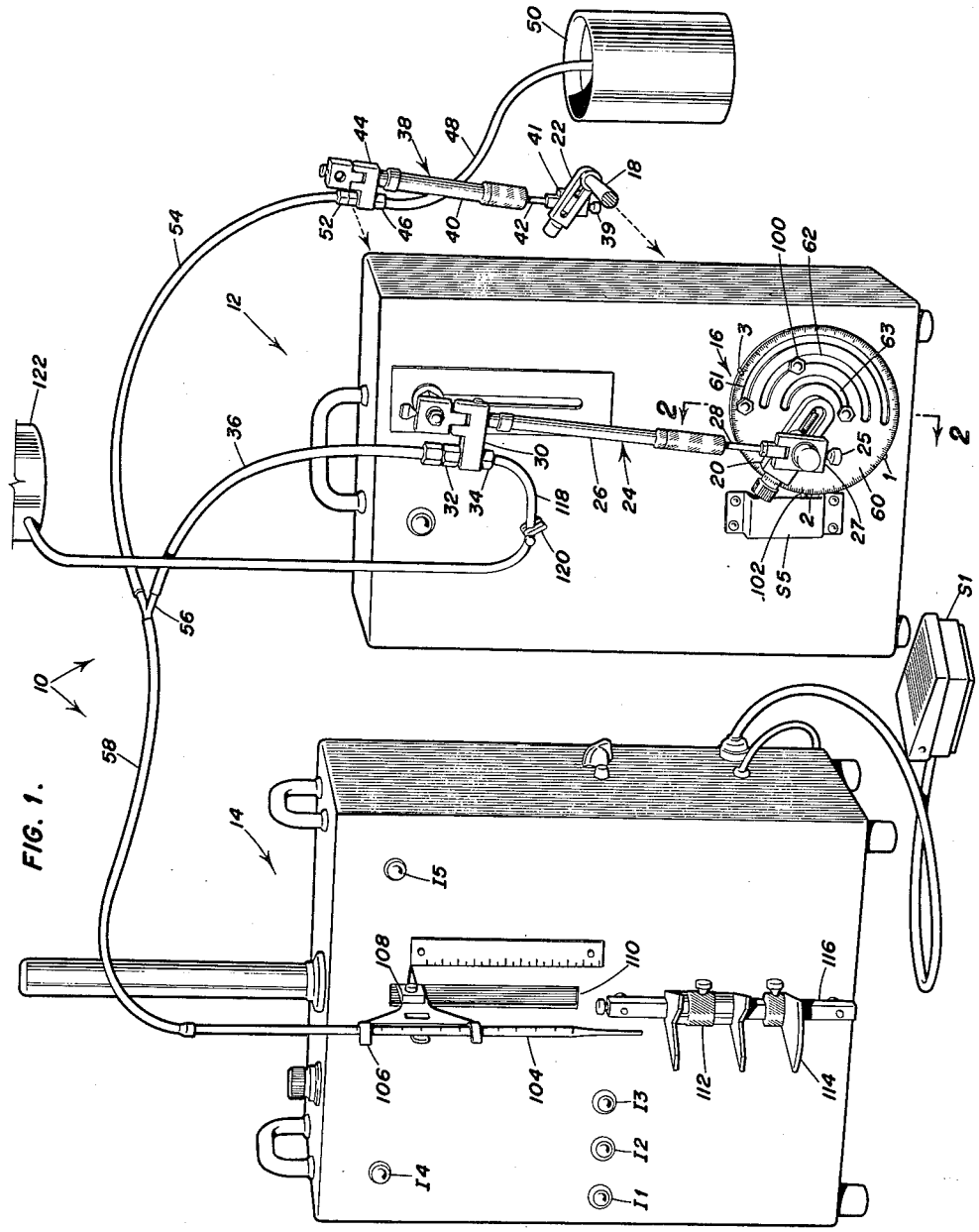
FIG. 1 is a perspective of the machine of the present invention incorporating novel features therein with certain elements exploded away for purposes of clarity.

Referring now to FIG. 1 of the drawings, the sampling machine 10 of the present invention is shown as consisting of pumping unit 12 and a sampling and delivery unit 14. A drive shaft 18 which protrudes from both sides of the pumping unit 12 has mounted on its nearest end a sequencing cam assembly 16 and an adjustable eccentric crank 20.

A second adjustable eccentric crank 22 is fixed to the far end of shaft 18. The axes of both cranks 20 and 22 lie in a common plane thus driving a pair of pumps 24 and 38 in phase. However, the throw lengths of both cranks 20 and 22 are adjustable so as to permit independent adjustment of the stroke length of each pump 24 and 38.

Pump 38 has the greater capacity and its valving arrangement differs from that of pump 24. Cylinder 40 of pump 38 mounts at its upper end a cylinder head block 44 which contains a passage that communicates between cylinder 40 and intake and delivery valves 46 and 52, respectively. Thus, an intake stroke of piston 42 will cause a quantity of reagent to be drawn from a reservoir 50 through a line 48, into cylinder 40.

The return stroke of the piston 42 will deliver the reagent, through lines 54 and 58, to a calibrated glass pipette 104, which is adjustably secured by a clamp 106 to a reciprocating arm 108 that protrudes from a slot 110 in the front panel of the unit 14.

Cylinder 26 mounts at its upper end a head block 30 similar to head block 44 of pump 38. However, the lower surface of head block 30 is provided with a hose fitting 34 instead of an intake valve. Further, no delivery check valve is provided in the fitting 32 which is secured to the upper surface of the headblock 30, thus leaving the passage in the headblock 30 always open to a line 36 and the cylinder 26. The intake stroke of pump 24 will aspirate a measured quantity of liquid from the outlet of supply line 58, the junction fitting 56, and the pipette. If the tip of the pipette is immersed in a test tube containing serum (or any other liquid sample), a quantity of this liquid will also be aspirated into the pipette. The delivery stroke of the pump 24 will restore the reagent to the lines. A priming line 118, which is fitted with a hose clamp 120, connects the fitting 34 to a priming supply reservoir 122.

Prior to placing the sampling machine 10 into operation, pumps 24 and 38 and the various hose lines must be primed which operation is accomplished as will now be explained. Pumps 24 and 38 are disconnected from cranks 20 and 22, respectively, by loosening thumbscrews 25 and 39 and sliding the connecting blocks 27 and 41 from their respective crank pins.

Piston 28 is manually pulled to its lowermost position and it is allowed to remain after which pump 38 is manually actuated a suflicient number of times to draw the reagent through the line 48 from the reservoir 50, thus filling itself and the line 54 and a portion of line 58. The priming reservoir 122 is then elevated, as shown in FIG. 1, so as to provide a pressure head and the line clamp 120 is then released, thereby allowing the reagent to flow through the priming line 118 into pump 24 and lines 36 and 58. Upon completion of priming, the clamp 120 is closed and the pumps are then reconnected to their respective cranks.

The lower surface of the reagent is then adjusted to the zero mark on the pipette 104 by shifting the position of pin 1 on cam assembly 16 as will be described in more detail subsequently.

A complete cycle of operation of the sampling machine 10, which is illustrated schematically in FIGS. 4 through 7, may now be described. The various elements of the sampling machine 10, at the beginning of a cycle must take the positions shown in FIG. 4. In other words, a switch actuating pin 1 will be in contact with an actuating button 102 of a switch S5. If such a condition does not exist at the beginning of a cycle of operation, then a foot switch S1, shown best in FIG. 1, is actuated until the pin 1 steps around to the position shown in FIG. 4.

As shown in FIG. 4, a specimen tube containing serum is manually placed and held within the V-shaped notches of a tube guide 112, with its bottom resting against a support 114. The guide 112 and the support 114 are adjustably secured to a column 116 as illustrated only in FIG. 1.

The foot switch S1 can now be actuated, causing the pipette 104 to move downwardly. Immediately after the tip of the pipette 104 breaks the surface of the serum, motor M2, of FIG. 8, will rotate the cam assembly 16 and the pump cranks 20 and 22 counterclockwise until the actuating pin 2 contacts the switch S5 at which time all movement ceases.

During the past cranking movement, pump 38 will have drawn into itself a quantity of reagent, through the line 48, from the reservoir 50. The check valve 52 will, of course, have prevented any loss of reagent from the line 54. During this same past cranking movement, pump 24 will have aspirated a small quantity of reagent from line 36, which, in turn, will be replaced by reagent from the line 58 and the pipette 104, causing an equivalent amount of serum to be drawn into the pipette 104.

It should be stressed that the speed of the pipette 104 during its downstroke is synchronized with the rate of aspiration of the pump 24 as to insure at all times that only the very tip of the pipette 104 will enter the surface of the serum, thus avoiding contamination of the exterior of the pipette 104.

Upon completion of the above step, all the various elements of the sampling machine 10 will hold the position shown in FIG. 5. Footswitch S1 is then actuated a second time, thereby causing the pipete 104 to withdraw from the serum specimen tube which will then be removed. Concurrently, motor M2 will rotate the cam assembly 16 and the cranks 20 and 22 counterclockwise until the actuating pin 3 contacts the switch S2 preventing additional further movement. The above movement will place the various elements in the positions illustrated by FIG. 6.

During the past cranking movement, pump 38 will have completed its intake stroke, thus filling itself from the reservoir 50 through the line 48 while check valve 52 again prevented loss of reagent from the line 54. During this same cranking movement, pump 24 will have aspirated an additional quantity of reagent as in the previous step, thereby drawing the serum further up into the pipette 104 and thus bringing the lower surface of the serum up to the zero mark. It should be noted that no undesirable mixing can occur within the pipette 104 due to the presence of the air bubble between the reagent and the serum.

A recipient mixing tube is now manually placed and held against guide 112 and then the footswitch S1 is actuated a third time. The pipette 104 now remains stationary in its elevated position. However, motor M2 will rotate the cam assembly and cranks 20 and 22 counterclockwise through somewhat more than 180° until the actuating pin 1 contacts the switch S5, thereby stopping the various elements in the position shown in FIG. 7 which duplicates the positions of FIG. 4. The sampling machine 10 is now ready for a new cycle.

During the just preceding cranking movement, pumps 24 and 38 will have discharged their full measure of reagent into the lines 36 and 54, respectively, thus forcing the serum and then a precise quantity of reagent into the recipient tube. Because of the restricted orifice at the tip of the pipette 104, the serum and the reagent will be emitted at a velocity which will insure an extremely thorough mixing of the two when they combine in the recipient tube.

It is important to note that the measured quantity of reagent just dispensed will remove any trace of the serum which preceded it, thus insuring against contamination of the succeeding specimen.

As mentioned above, the cranks 20 and 22 will have been driven through more than 180°. Hence, in addition to completing a full delivery stroke, each of the pumps 24 and 38 will, in passing top dead center at the end of their delivery stroke, execute a very short portion of their intake stroke. Pump 38 will draw up a small quantity of reagent from the reservoir 50 and, most importantly, pump 24 will pull the lower surface of the reagent back to the zero mark on the pipette 104, thus providing the air which will separate the reagent from the next serum specimen.

A valuable feature of the present sampling machine 10 lies in the fact that any one of the stop pins 1, 2 or 3, on sequencing cam assembly 16, may be adjusted without disturbing the position of the other two.

An example of the effects of such an adjustment will now be explained. Shifting pin 1 towards pin 3 in a counterclockwise direction will reduce the amount of air aspirated into the pipette 104 at the end of a cycle, thus dropping the level of the lower surface of the reagent. This shift in the pins 1 and 3 will also increase the amount of serum drawn into the pipette 104 during the second step of the cycle illustrated in FIG. 5. Shifting the pin 1 away from pin 3 or in the opposite direction, would, of course, reverse the above two effects.

FIGS. 1, 2 and 3 best disclose the arrangement of the elements of the sequencing cam assembly 16 wherein there are shown a series of four adjacent discs 60, 70, 80 and 90.

Calibrated disc or faceplate 60 is apertured at 64, and it has provided a flange 66 on its rear face by which it is centered on a mounting flange 96 of shaft 18. The faceplate 60 is securely clamped by the screws 98 between the rear face of the crank 20 and the mounting flange 96.

Faceplate 60 is further provided with a series of three equal width arcuate and concentrically arranged slots 61, 62 and 63. Disc 70 is provided with an aperture 74 of a diameter that will provide a loose fit around the flange 66. Disc 70 is further provided with a pair of arcuate concentrically arranged slots 72 and 73, the diameter of whose centerline corresponds to the centerline diameter of slots 62 and 63, respectively. However, the slots 72 and 73 are of slightly greater width than slots 62 and 63 respectively, of disc 60. Actuating pin 1 is welded to the edge of disc 70, and a threaded stud 71 is welded to the disc at a distance from the centering disc 70 equal to the centerline radius of slot 61 of disc 60.

Disc 80 is apertured at 84 and it is provided with a single slot 83 of exactly the same size as slot 73 of disc 70. The actuating pin 2 is welded to the edge of disc 80 and almost directly across the disc a shouldered and threaded boss 82 is welded to the disc at a distance from the center of disc 80 equal to the centerline radii 4 slots 72 and 62 in discs 70 and 60, respectively. The shouldered or larger diameter portion of the boss 82 has an axial length just slightly greater than the thickness of disc 70.

A final slotless disc 90, apertured at 94, has welded to its edge the actuating pin 3. A shouldered and threaded boss 93 is welded to the disc 90 at a distance from the disc center equal to the centerline radii of slots 83, 73, and 63 of discs 80, 70 and 60, respectively. The larger diameter portion of boss 93 has an axial length just slightly greater than the combined thickness of discs 80 and 70.

When the four discs are assembled together, as best illustrated in FIG. 2, boss 71 of disc 70 will pass through the slot 61 of disc 60. An acorn type locknut 100 is used to lock disc 70 against disc 60. The shouldered boss 82 of disc 80 will pass through the slot 72 of disc 70 and slot 62 of the disc 60. The shouldered portion of boss 82 will prevent jamming of the disc 70 when the disc 80 is locked to disc 60 by its nut 100.

Finally, shouldered boss 93 will pass through slots 83, 73, and 63 of discs 80, 70, and 60, respectively, with the shouldered portion of boss 93 preventing jamming of discs 80 and 70. Thus, it can be noted that any one of the three actuating pin carrying discs 90, 80, or 70 can be adjusted without disturbing the setting of the others.

The electrical circuitry which sequences the various operations previously related is illustrated in the schematic diagram of FIG. 8. Indicator lights I1 to I5 inclusive indicate to the operator the status of the operations during a cycle of operation of the sampling machine 10, with alternating current supply means. L1 and L2 being provided for the circuit, while direct current supply lines L3 and L4 are provided from an electronically controlled rectifier for affording constant torque and stepless variable speed from motors M1 and M2 of the filler assembly 12 and pipette transport unit 14.

Shaft 18 of motor M2 is provided with an adjustable cam switch S8, while motor M1 is provided with three adjustable cam switches S2, S3, and S4. In addition, the pipette drive arm 108 (shown in FIG. 1) has a line or cam 124 which functions to operate a switch S6 during the vertical movement of the pipette 104.

A two position impulse type relay K3 is provided for the circuit. Its contacts must be in the position shown at the start of a cycle with the indicator I1 lighted. The switch S7 is provided to assure that this condition is met.

Foot switch S1 is depressed to energize the relay K1 momentarily while the pipette transport motor M1 starts to rotate moving the pipette 104 downwardly. The cam switch S2 transfers the motor M1 to the +D.C. line L3 directly so the motor M1 continues to run after the foot switch S1 is released. Switch S6 then closes with downward movement of the pipette cam and indicator I2 lights and relay K2 is then energized.

The filler motor M2 begins an aspirating stroke between pins 1 and 2 of the cam plate 16, cam disc switch S5 shifts as it drops off the pin 1, and the stepper relay K4 is then energized and is ready for a step. It is to be noted that relay K4 is of the set-step action type where its contact transfer occurs on de-energization.

As the pipette cam nears its downward maximum, the switch S6 opens the extinguishing indicator I2 and releases the relay K2. The stepper relay K4 is then de-energized, completing a step action to extinguish the indicator I3 and lighting the indicator I4. The pipette transport motor M1 continues to run until the cam switch S2 applies a brake resistor R1 (top of transport stroke) and the filler motor M2 will run until the cam disc switch S5 is shifted by pin 2 to apply the brake resistor R2.

The foot switch S1 is then depressed a second time and the relay K1 is energized to start the motor M1, beginning an upward pipette transport action. Cam switch S3 is then momentarily closed as the motor M1 starts moving the pipette 104 and this impulse shifts the relay K3 (downwardly on the schematic diagram). The indicator I1 then extinguishes and the relay K5 is energized. The pipette switch S6 then closes as the pipette 104 continues to move upwardly lighting the indicator I2.

Motor M1 runs until the brake resistor R1 is applied by its cam as previously related. Just before this reaches the up position and the motor M1 is stopped, switch S4 is momentarily closed. This starts the filler motor M2 which completes an aspiration stroke from pin 2 to pin 3 of the cam plate 16.

The foot switch S1 is then depressed a third time. Since relay K1 is now out of circuit by shifted relay K3, the relay K2, instead, is energized, starting the filler motor M2 in a pump stroke. The relay K2 is set for a step action and then steps as the foot switch S1 is released and drops out the relay K2. The indicator I4 then extinguishes and the indicator I5 lights. The cam switch S8 is momentarily closed and the impulse resets K3 (upward). The filler motor M2 runs until its brake resistor R2 is applied by the shifting of switch S5 by the cam plate pin 1. The cycle is now complete.

Obviously many modifications and variations of the present invention are possible in the light of the above teachings. It is, therefore, to be understood that within the scope of the appended claims the invention may be practiced otherwise than as specifically described.

What is claimed is:

1. A sampling machine, comprising a pair of stroking pump means, at least one of which is uni-directional and both having an inlet and an outlet, common means for stroking said pump means, and a reservoir containing reagent, the inlet of one of said pair of stroking pump means, which is uni-directional, being connected to said reservoir, the outlet of said last mentioned pump means and the inlet and outlet of the other of said pair of stroking pump means being connected to a common passage, said common passage having an outlet for alternately communicating with a sample supply container and a receiving container when alternately positioned therebeneath, said receiving container being for receiving a mixture of measured amounts of sample and reagent, whereby proportional quantities of reagent and sample can be withdrawn from said reservoir and sample supply container, respectively, by said pair of stroking pump means and discharged thereby through said common passage to said receiving container.

2. A sampling machine, comprising, a stroking pump means having an aspirating stroke and a discharging stroke with a common inlet and outlet, a uni-directional stroking pump means having an inlet and an outlet, common means for stroking said pump means, the inlet and outlet of said aspirating stroking pump means and the outlet of said uni-directional stroking pump means being connected to a common passage, said common passage having an outlet for alternately communicating with a sample supply container and a receiving container when alternately positioned therebeneath, said receiving container being for receiving a mixture of measured amounts of sample and reagent, and a reservoir containing reagent, the inlet of said uni-directional pump means being connected to said reservoir, whereby proportional quantities of reagent and sample can be withdrawn from said reservoir and sample supply container, respectively, by said stroking pump means and discharged thereby through said outlet of said common passage to said receiving container.

3. A sampling machine as recited in claim 2, and additionally a graduated pipette means connected to said outlet of said common passage for indicating a quantity of sample withdrawn from the sample supply container.

4. A sampling machine as recited in claim 3, and additionally transport means for extending said graduated pipette means into said sample supply container during withdrawal of sample therefrom and at a rate to maintain only the tip of said graduated pipette means in contact with the sample in said sample supply container.

5. A sampling machine comprising at least one stroking pump means having an aspirating stroke and a discharging stroke with a common inlet and outlet, a uni-directional stroking pump means having an inlet and an outlet, common means for stroking said pumps, a graduated pipette means, the inlet and outlet of said aspirating pump and the outlet of said uni-directional pump means being connected to said pipette means, said pipette means having an outlet for alternately communicating with a sample supply container and a receiving container when alternately positioned therebeneath, said receiving container being for receiving a mixture of measured amounts of sample and reagent, and a reservoir containing reagent, the inlet of said uni-directional pump means being connected to said reservoir, whereby proportional quantities of reagent and sample can be withdrawn from said reservoir and said sample supply container, respectively, by said pump means and discharged by said pump means into said receiving container, said pipette means being utilized to indicate a quantity of sample withdrawn from said sample supply container.

6. A sampling machine as recited in claim 5, and means connected to said stroking pumps for setting the amount of reagent and sample withdrawn from their respective supply containers and delivered to said graduated pipette means for subsequent delivery to said receiving container, said means including, in combination, adjustable eccentric crank means connected to each said stroking pumps, cam means mounted on said common means for stroking said stroking pumps and in turn connected to at least one of said crank means, said cam means having a plurality of adjustable cycle control means arranged thereon, and means responsive to said cycle control means to effect automatic adjustable proportioning of sample and reagent sampled and combined by said sample machine.

7. A sampling machine comprising a stroking pump means having an aspirating stroke and a discharging stroke with a common inlet and outlet, a uni-directional stroking pump means having an inlet and an outlet, common means for stroking said pump means, a graduated pipette means, the inlet and outlet of said aspirating stroking pump means and the outlet of said uni-directional stroking pump means being connected to said pipette means, said pipette means having an outlet for alternately communicating with a sample supply container and a receiving container when alternately positioned therebeneath, said receiving container being for receiving a mixture of measured amounts of sample and reagent, a reservoir containing reagent, the inlet of said uni-directional pump means being connected to said reservoir, said stroking pump means being arranged to withdraw proportional quantities of reagent and sample from said reservoir and sample supply container, respectively, and to cause an air space to be present between the volume of sample withdrawn from said sample supply container into said pipette means and the reagent in the rest of the sampling machine.

References Cited by the Examiner

UNITED STATES PATENTS

| | | | |
|---|---|---|---|
| 1,654,004 | 12/27 | Lind | 141—105 |
| 2,661,885 | 12/53 | McBean | 141—105 XR |
| 2,807,213 | 9/57 | Rosen | 103—38 XR |
| 3,012,863 | 12/61 | Feichtmeir | 23—253 |

MORRIS O. WOLK, *Primary Examiner.*

RICHARD C. QUEISSER, *Examiner.*